(12) United States Patent
Hsieh

(10) Patent No.: US 12,098,740 B2
(45) Date of Patent: Sep. 24, 2024

(54) THREADED FASTENER CAPABLE OF TORQUE DETECTION

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 205 days.

(21) Appl. No.: 17/936,556

(22) Filed: Sep. 29, 2022

(65) Prior Publication Data
US 2023/0104753 A1 Apr. 6, 2023

(30) Foreign Application Priority Data
Oct. 6, 2021 (TW) ................................. 110137114

(51) Int. Cl.
*F16B 31/02* (2006.01)
*G01L 5/24* (2006.01)

(52) U.S. Cl.
CPC ................ *F16B 31/02* (2013.01); *G01L 5/24* (2013.01)

(58) Field of Classification Search
CPC .. F16B 31/02; F16B 2031/022; F16B 31/025; F16B 31/028; G01L 5/24; G01L 5/245; G01L 5/243
USPC ...................................................... 411/8, 14
See application file for complete search history.

(56) References Cited

U.S. PATENT DOCUMENTS

| | | | | |
|---|---|---|---|---|
| 2,998,585 | A * | 8/1961 | Bodner | F16B 31/028 73/753 |
| 4,294,122 | A * | 10/1981 | Couchman | G01N 29/24 73/761 |
| 7,412,898 | B1 * | 8/2008 | Smith | F16B 31/025 73/761 |
| 8,784,023 | B2 * | 7/2014 | Kuntner | B25B 23/14 411/8 |
| 8,991,266 | B2 * | 3/2015 | Hsieh | G01L 5/24 73/862.21 |
| 9,121,777 | B2 * | 9/2015 | Hsieh | F16B 31/025 |
| 9,371,852 | B2 * | 6/2016 | Hsieh | F16B 31/02 |
| 9,492,901 | B2 * | 11/2016 | Peltz | G01L 5/166 |
| 10,190,618 | B2 * | 1/2019 | McKinley | G01L 5/0019 |
| 2010/0054891 | A1 * | 3/2010 | Nishida | B25B 23/14 73/761 |
| 2018/0067003 | A1 * | 3/2018 | Michiwaki | G01L 5/0004 |
| 2023/0258520 | A1 * | 8/2023 | Jurisch | F16B 37/00 411/14 |

* cited by examiner

*Primary Examiner* — Flemming Saether
(74) *Attorney, Agent, or Firm* — Wang Law Firm, Inc.

(57) ABSTRACT

A threaded fastener capable of torque detection includes: a head and a shank connected together, wherein the shank has a threaded peripheral surface; a neck formed at the junction between one end of the shank and the head; and at least one sensing element and a sealing element, both provided on the neck, wherein the sensing element is configured to detect deformation of the neck, and the sealing element seals the sensing element. The threaded fastener may further include a covering element that covers the sealing element. The threaded fastener can be deformed consistently, allowing the sensing element to obtain relatively accurate detection values.

10 Claims, 5 Drawing Sheets

THREADED FASTENER CAPABLE OF TORQUE DETECTION

BACKGROUND OF THE INVENTION

1. Technical Field

The present invention relates to a threaded fastener for fastening an object by a screw thread. More particularly, the invention relates to a threaded fastener capable of detecting the torque applied thereto.

2. Description of Related Art

A threaded fastener, such as a bolt, is designed to fasten an object by a screw thread. To know the magnitude of the torque with which a threaded fastener is tightened to fasten an object, Published Japanese Patent Application No. Hei-6-221315 discloses a threaded fastener 10 as shown in FIG. 1. A cavity 13 is provided at the junction between the threaded shank 11 and the head 12, and a strain gage 14 is mounted in the cavity 13. When the threaded fastener 10 fastens an object threadedly, the magnitude of the torque with which the threaded fastener 10 is tightened to fasten the object can be derived from the strain of the strain gage 14.

While the threaded fastener 10 in the aforesaid patent application allows information about the magnitude of the torque acting on the threaded fastener 10 to be obtained, there is still something to be desired in terms of its structural design. First, the cavity 13 renders the configuration of the threaded fastener 10 asymmetric. As shown in FIG. 1, the left-side structure of the threaded fastener 10 is formed with the cavity 13 while the right-side structure of the threaded fastener 10 is not. The asymmetric structure results in inaccuracy in measuring the deformation of, and hence the magnitude of the torque applied to, the threaded fastener 10.

Second, the cavity 13 extends from the surface of the threaded shank 11 into the head 12, and it is difficult and therefore costly to make the cavity 13 at the junction between the threaded shank 11 and the head 12 with any existing machining technique, be it turning, milling, or grinding.

Furthermore, structural damage tends to take place around the cavity 13, which is, after all, a hole formed at the junction between the threaded shank 11 and the head 12. In other words, the cavity 13 compromises the structural strength of the threaded fastener 10.

Last but not least, the strain gage 14 is exposed to view without any protection and may be easily damaged by collision, thus losing its function.

BRIEF SUMMARY OF THE INVENTION

The present invention aims to solve the problems stated above, the primary objective being to provide a threaded fastener that is capable of torque detection and allows the magnitude of the torque acting on the threaded fastener to be detected accurately.

Another objective of the present invention is to provide a threaded fastener that is capable of torque detection and can be manufactured with ease.

Yet another objective of the present invention is to provide a threaded fastener that is capable of torque detection and has high structural strength.

Still another objective of the present invention is to provide a threaded fastener that is capable of torque detection and whose sensing element is protected from damage and hence allowed to have a long service life.

To achieve the foregoing objectives, the present invention provides a threaded fastener capable of torque detection, wherein the threaded fastener includes a head and a shank. The shank is connected to an end surface of the head and has a threaded peripheral surface. The threaded fastener further includes a neck, at least one sensing element, and at least one sealing element. The neck is formed at the junction between one end of the shank and the head and has a non-threaded peripheral surface. The sensing element is provided on the neck to detect deformation of the neck. The sealing element is provided on the neck to seal the sensing element.

The aforesaid structural features are such that the threaded fastener does not have any cavity (for receiving the sensing element) at the junction between the head and the shank. The threaded fastener, therefore, will have consistent and uniform deformation, allowing the sensing element to obtain relatively accurate detection values. Moreover, as the threaded fastener does not require a cavity for receiving the sensing element, it has higher structural strength and is easier to manufacture than the threaded fastener described in Description of Related Art. Besides, the sealing element provides protection for, and thereby reduces the chance of damage of, the sensing element.

In one embodiment of the present invention, the neck has a smaller diameter than the shank so that not only can the threaded fastener be deformed more sensitively, but also the detection values obtained can be more accurate than if the neck were as thick as the shank.

One embodiment of the present invention further includes a covering element provided on the neck to cover the sealing element such that the sealing element is not exposed to view.

In one embodiment of the present invention, the sealing element is a ductile material in order to produce a better sealing effect than a non-ductile material.

In one embodiment of the present invention, the sealing element surrounds the neck.

In one embodiment of the present invention, the covering element covers the neck and the sealing element. Preferably, the covering element has a covering portion and a disk portion. The disk portion is located at one end of the covering portion. The covering portion covers the neck and the sealing element. The disk portion is in contact with the aforesaid end surface of the head.

In one embodiment of the present invention, the covering element is elastic.

BRIEF DESCRIPTION OF THE SEVERAL VIEWS OF THE DRAWINGS

The objectives, features, and intended effects of the present invention can be better understood by referring to the following description of a preferred embodiment of the invention in conjunction with the accompanying drawings, in which.

DETAILED DESCRIPTION OF THE INVENTION

Figure 1:
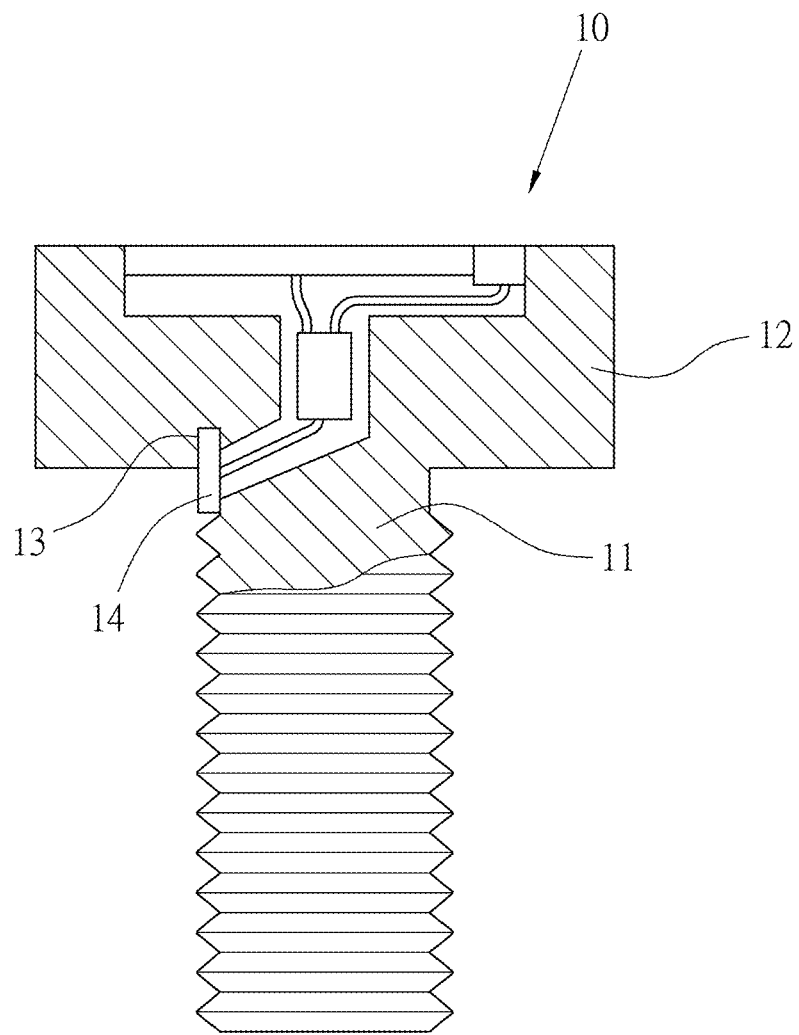
FIG. 1 is a partially sectional view of a conventional threaded fastener.
Figure 2:
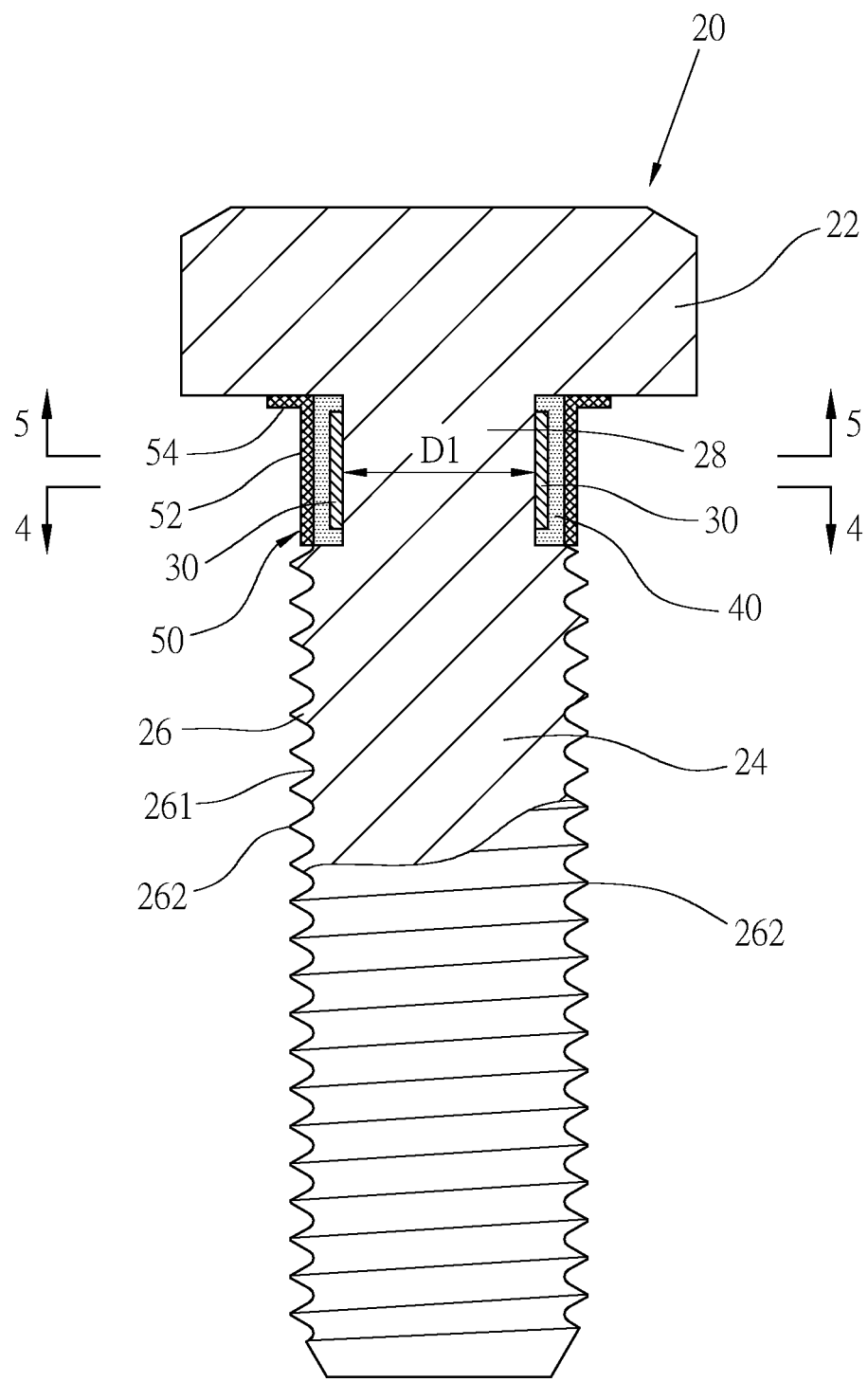
FIG. 2 is a partially sectional view of the threaded fastener according to a preferred embodiment of the invention.

Referring to FIG. 2, the threaded fastener 20 provided by a preferred embodiment of the present invention is configured to detect the magnitude of the torque with which the threaded fastener 20 is tightened to fasten an object threadedly. The threaded fastener 20 is mounted with at least one sensing element 30, a sealing element 40, and a covering element 50.

The threaded fastener 20 has a head 22 and a shank 24 connected to the bottom surface of the head 22. The head 22 is so designed that a wrench-type hand tool can be mounted around or engaged with the head 22 in order to rotate the threaded fastener 20. The configuration of the head 22 is not limited to that disclosed in this embodiment and can be changed in order to work with different types of wrenches or other hand tools. The peripheral surface of the shank 24 is provided with a thread 26.

Figure 3:
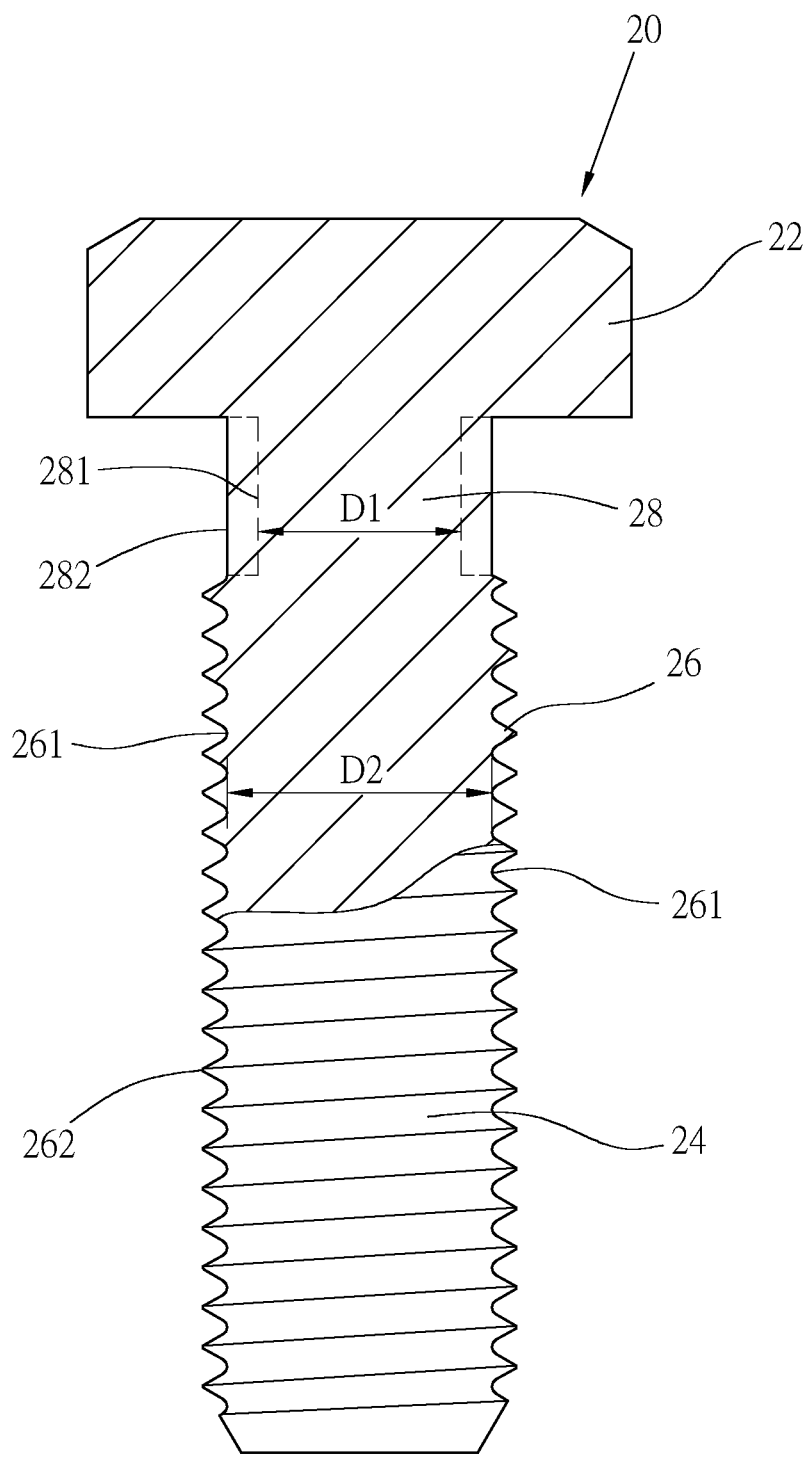
FIG. 3 is a partially sectional view of the main body of the threaded fastener according to the preferred embodiment of the invention.

Referring to FIG. 3, a neck 28 is defined at the junction between one end of the shank 24 and the head 22. The neck 28 is not threaded in the first place or has had its thread removed such that, before further machining, the peripheral surface of the neck 28 corresponds to the root 261 of the thread 26; in other words, the original diameter of the neck 28 is equal to the diameter D2 of the root 261.

According to the present invention, the diameter of the neck 28 is rendered smaller than that of the shank 24. More specifically, the neck 28 in this embodiment is turned such that the diameter of the neck 28 is reduced from that indicated by the solid lines 282 to that indicated by the dashed lines 281, i.e., to the diameter D1 in FIG. 3. The diameter D1 is smaller than the diameter D2 of the root 261 of the thread 26. Once reduced in diameter, the neck 28 can be deformed (e.g., stretched or twisted) more easily and will have a more sensitive strain than before the diameter is reduced.

Figure 4:
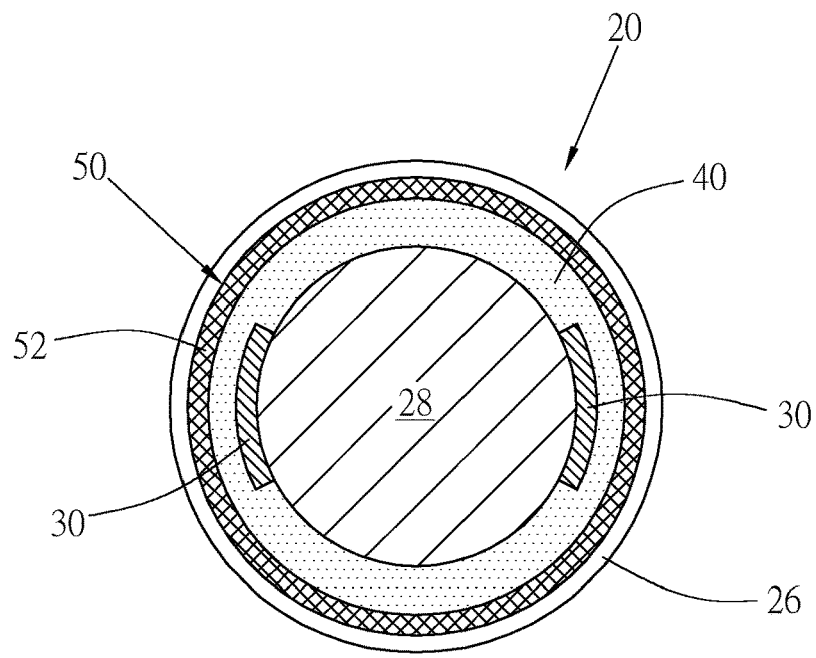
FIG. 4 is a sectional view taken along line 4-4 in FIG. 2.

Referring to FIG. 4, a plurality of sensing elements 30 are provided at equal intervals on the peripheral surface of the neck 28. In this embodiment, two sensing elements 30 are adhesively bonded to the neck 28 and are 180 degrees apart from each other. The sensing elements 30 may be tension gages, strain gages, or other sensing elements with a sensing chip. The sensing elements 30 are configured to transmit, in a wired or wireless manner, the data they sense, wherein wireless transmission may be carried out by, for example but not limited to, an infrared, Bluetooth, electromagnetic wave, or wireless radio frequency-based transmission technique.

The sealing element 40 is a soft material that is deformable and ductile. The sealing element 40 is provided on the neck 28 of the shank 24 to seal the two sensing elements 30 such that the sensing elements 30 are protected, and isolated from the outside, by the sealing element 40. The sealing element 40 surrounds the neck 28 in an annular manner. In this embodiment, silicone is used as the sealing element 40, and this silicone sealing element 40 can work at temperatures ranging from −50° C. to 80° C. such that the threaded fastener 20 is usable under extreme weather conditions or in harsh environments. Thanks to its softness and ductility, the sealing element 40 can produce on the sensing elements 30 a desirable sealing effect that will not be affected by torsion of the threaded fastener 20. The sealing element 40 may have any structural configuration capable of sealing the sensing elements 30 and does not necessarily enclose the entire neck 28, provided that the sensing elements 30 are isolated from the outside. For example, the sealing element 40 may form a full circle or a partial circle while sealing the sensing elements 30.

Figure 5:
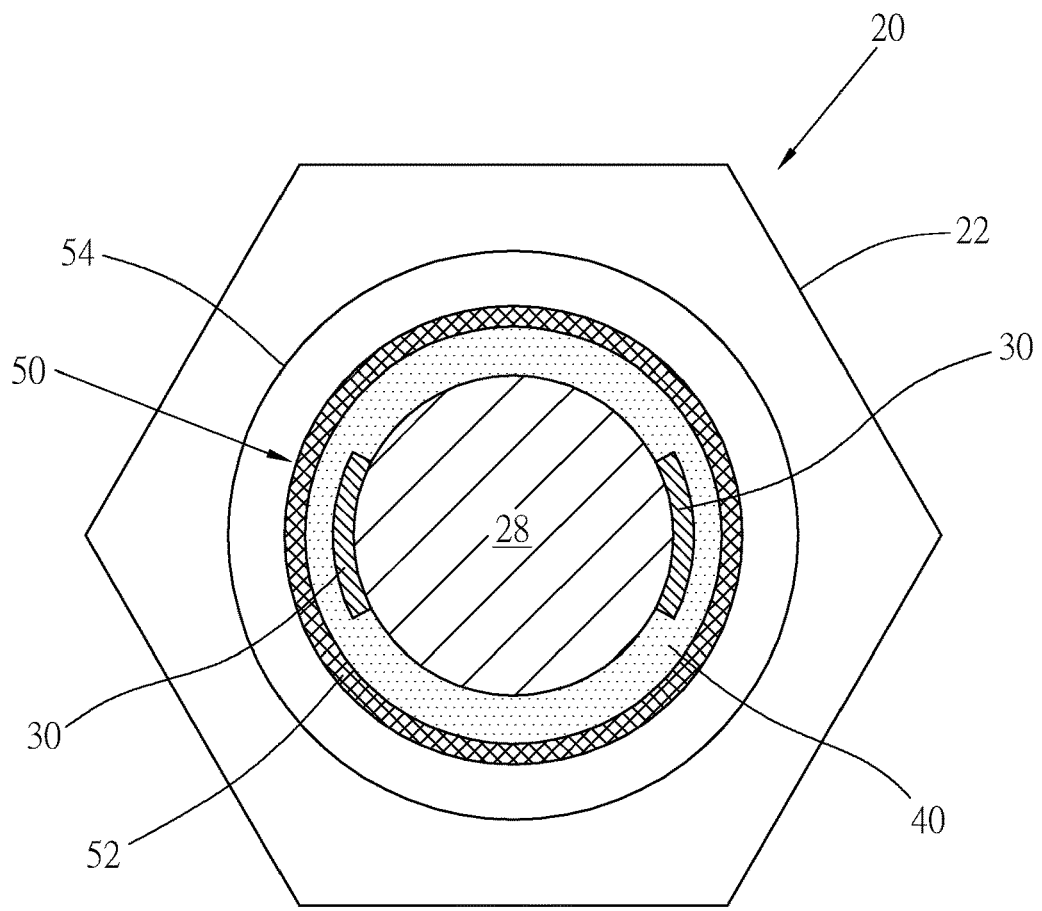
FIG. 5 is a sectional view taken along line 5-5 in FIG. 2.

The covering element 50 is provided on the neck 28 and covers the sealing element 40 in order to protect the sealing element 40 and the two sensing elements 30 and maintain the integrity of the sealing element 40. The covering element 50 is preferably made of a polymeric material such as plastic or rubber. In this embodiment, the covering element 50 is made of an elastic polyurethane (PU) material and therefore features weather resistance, wear resistance, crack resistance, thermal insulation, acoustic insulation, and chemical resistance. As shown in FIG. 5, the covering element 50 includes a covering portion 52 and a disk portion 54. The disk portion 54 extends outward from one end of the covering portion 52. The covering portion 52 in this embodiment covers the entire neck 28 and thereby covers the sealing element 40 and the two sensing elements 30. The disk portion 54 lies compliantly on the bottom surface of the head 22. The disk portion 54 helps increase the structural strength and stability of the covering element 50. Preferably, the outer diameter of the covering portion 52 is not larger than the diameter of the crest 262 of the thread 26. In this embodiment, the covering portion 52 is a hollow portion and covers the neck 28 and the sealing element 40 in an elastic manner. The outer configuration of the covering portion 52 may resemble that of a cylinder or a polygonal prism.

The threaded fastener 20 is provided with a detection circuit unit and may be provided with a power source (e.g., a battery or solar cell), a display (e.g., a liquid crystal display), and/or an antenna according to practical needs. The detection circuit unit is configured to convert the deformation of the sensing elements 30 or the strain detected by the sensing elements 30 into the magnitude of the torque acting on the threaded fastener 20. The display can be used to display such information as the value and unit of the torque acting on the threaded fastener 20. The antenna can be used to transmit or receive data. The battery can be used to supply the electrical energy required to sustain operation of the related components.

Figure 6:
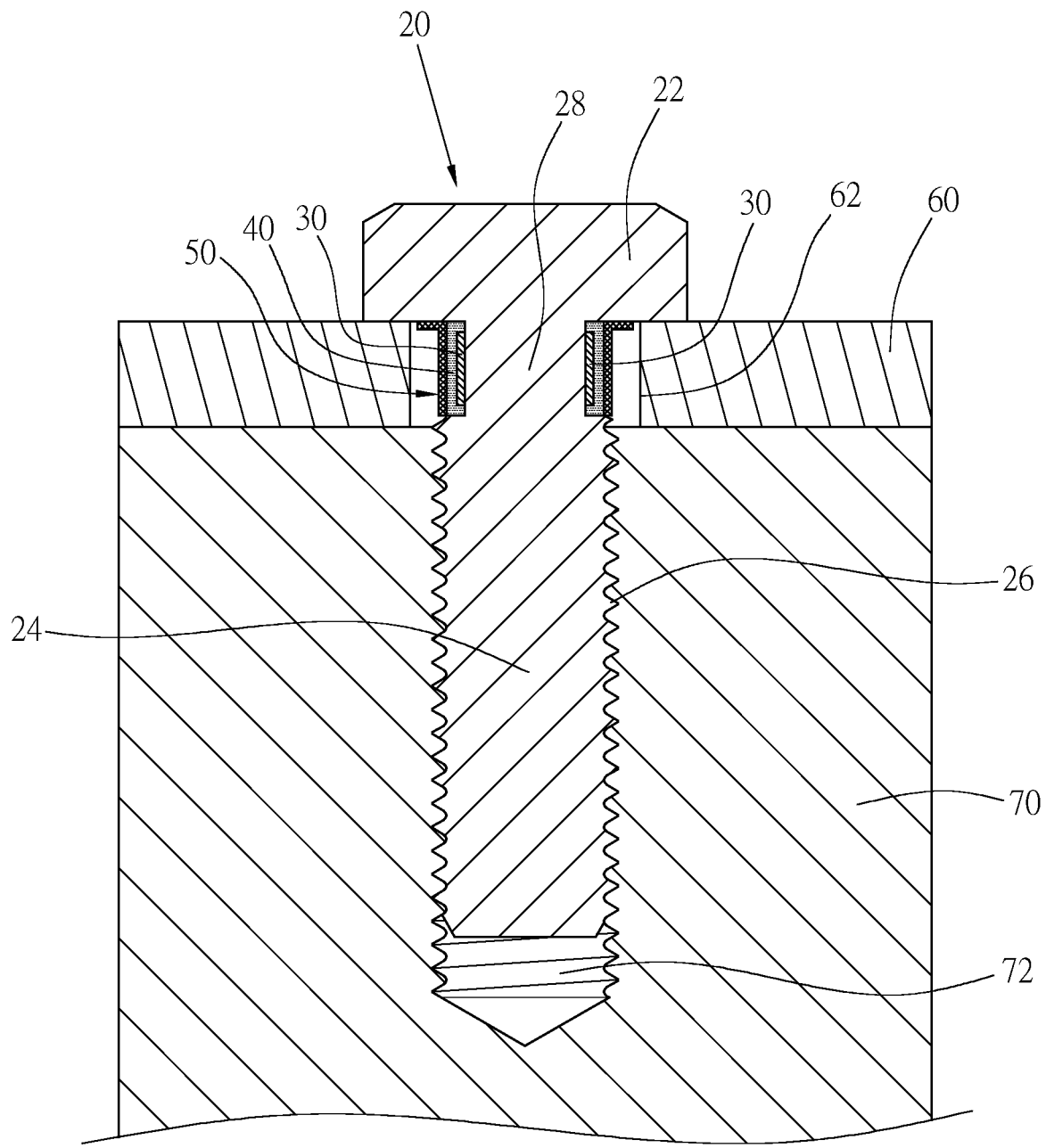
FIG. 6 shows how the threaded fastener of the invention is used to secure an object.

FIG. 6 shows how an object 60 is threadedly fastened to a base 70 by the threaded fastener 20 of the present invention. The shank 24 of the threaded fastener 20 is passed through a hole 62 of the object 60 and threadedly connected to a threaded hole 72 of the base 70. A wrench or another appropriate tool is then used to rotate the threaded fastener 20 by the head 22 so as to secure the object 60 in position.

Once the object 60 is threadedly fastened by the threaded fastener 20, the thread 26 of the shank 24 and the thread of the threaded hole 72 are in close contact with each other, and the head 22 is pressed tightly against the object 60, such that the neck 28 (i.e., the portion between the head 22 and the shank 24) has a composite strain, namely a torsional strain and a tensile strain. The sensing elements 30 can detect the deformation corresponding to the composite strain, in order for the detection circuit unit to calculate the magnitude of the torque acting on the threaded fastener 20, and for the user to obtain the magnitude of the torque by reading the magnitude wirelessly or otherwise.

The threaded fastener 20 provided by the present invention is so designed that the junction between the head 22 and the shank 24 (including the neck 28) is a symmetric structure. The deformation of the threaded fastener 20, therefore, will be uniform and consistent, allowing the sensing elements 30 to obtain accurate detection values. In this embodiment, the two sensing elements 30 are provided on the neck 28 symmetrically at equal intervals so that the magnitude of the torque acting on the threaded fastener 20 can be calculated accurately from the data sensed by the two differently located sensing elements 30.

In this embodiment, the threaded fastener 20 is turned to form the neck 28, which has a relatively small diameter and therefore can be deformed to a relatively great extent, allowing relatively sensitive detection values to be obtained. As the turning operation is a simple machining process, the threaded fastener 20 of the present invention is easy to manufacture.

In addition, the threaded fastener 20 has high structural strength because it does not require any cavity to be formed between the head 22 and the shank 24 of the threaded fastener 20 in order to receive the sensing elements 30.

The sensing elements 30 in the present invention are protected by the sealing element 40 and the covering element 50, so the chance of the sensing elements 30 being damaged by collision is reduced. This helps extend the service life of the threaded fastener 20.

The embodiment described above serves only to expound, but not to limit, the technical features of the present invention. All equivalent modifications based on the invention shall be viewed as falling within the scope of the patent protection sought by the applicant. The structure of the invention is the first of its kind, provides an improvement in functionality, and is therefore believed by the applicant to have satisfied the patentability requirements.

What is claimed is:

1. A threaded fastener capable of torque detection, comprising:
    a head;
    a shank having a peripheral surface provided with a thread;
    a neck formed at a junction between an end of the shank and an end surface of the head, wherein the neck has a non-threaded peripheral surface and is aligned with the shank;
    at least one sensing element provided on the neck to detect deformation of the neck; and
    at least one sealing element provided on the neck to seal the corresponding sensing element,
    wherein the at least one sensing element is curved along a periphery of the neck and the at least one sealing element is circular with a through hole and the neck passes through the through hole.

2. The threaded fastener of claim 1, wherein the neck has a smaller diameter than the shank.

3. The threaded fastener of claim 1, wherein the neck has a smaller diameter than a root of the thread.

4. The threaded fastener of claim 1, further comprising a covering element provided on the neck to cover the sealing element.

5. The threaded fastener of claim 4, wherein the covering element covers the neck and the sealing element.

6. The threaded fastener of claim 5, wherein the covering element is elastic.

7. The threaded fastener of claim 5, wherein the covering element has a covering portion and a disk portion, the disk portion is located at an end of the covering portion and extends outward, the covering portion covers the neck and the sealing element, and the disk portion is in contact with the end surface of the head.

8. The threaded fastener of claim 1, wherein the sealing element is a ductile material.

9. The threaded fastener of claim 1, wherein the sealing element surrounds the neck.

10. The threaded fastener of claim 1, comprising a plurality of said sensing elements provided on the neck at equal intervals.

* * * * *